UNITED STATES PATENT OFFICE.

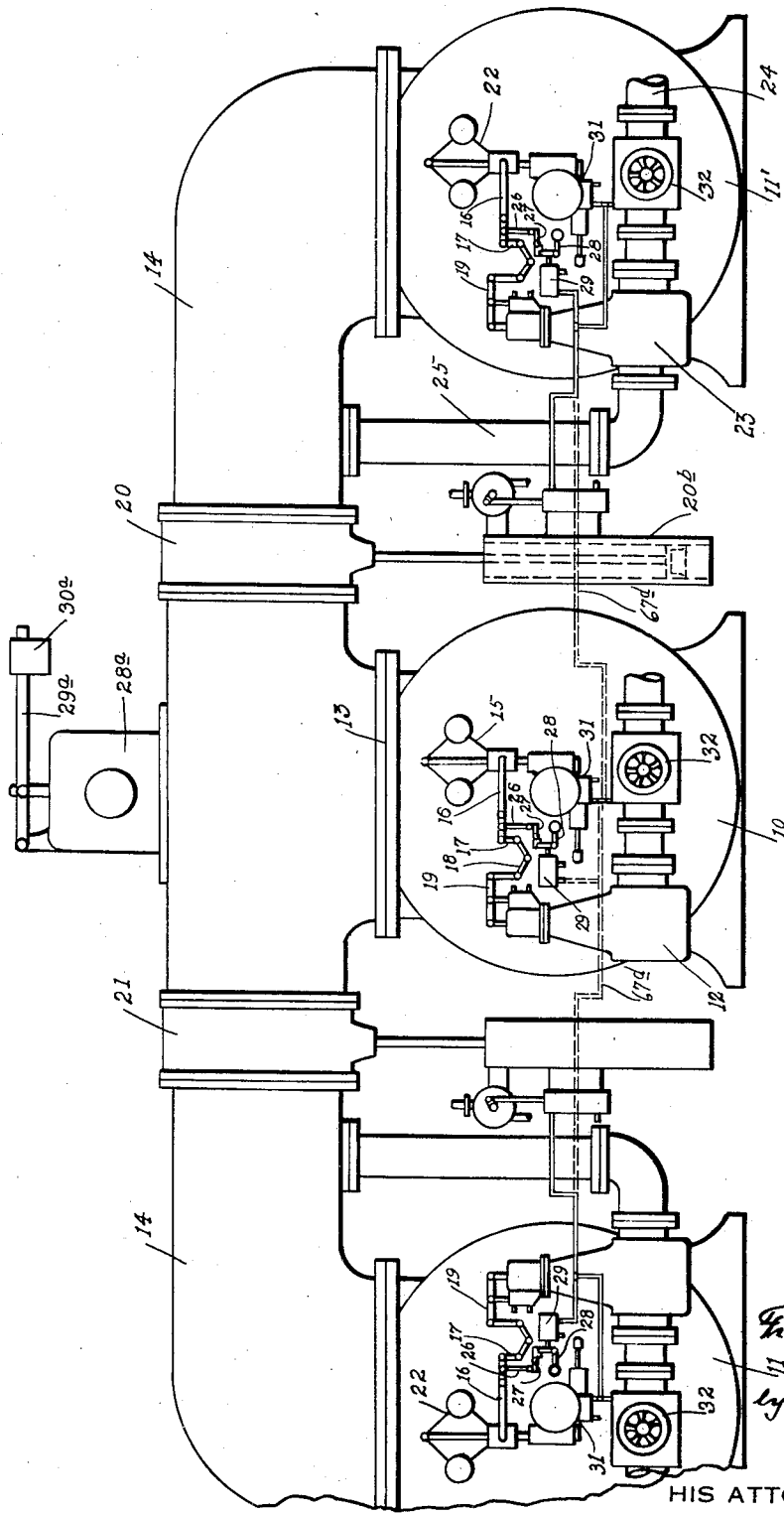

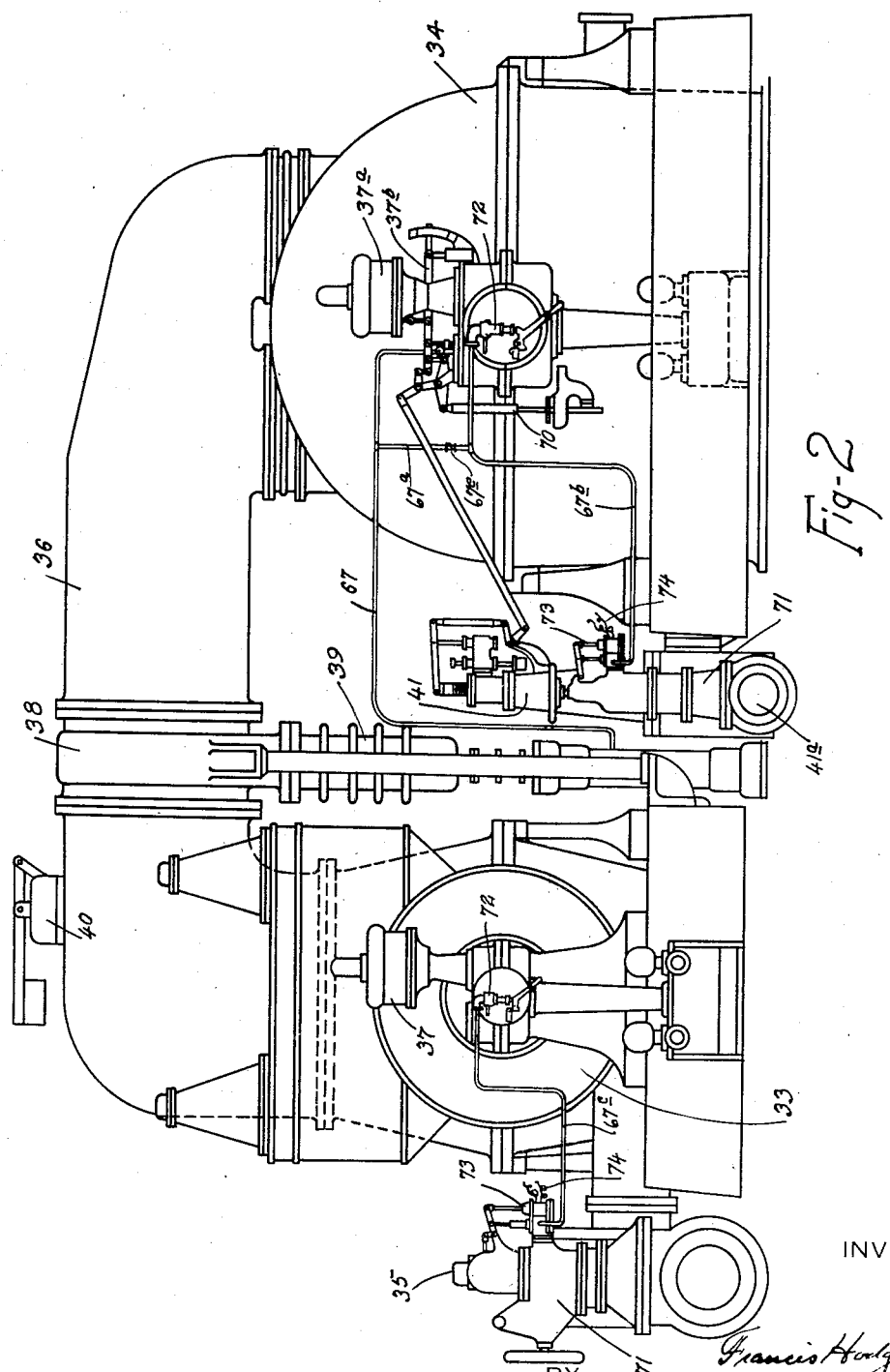

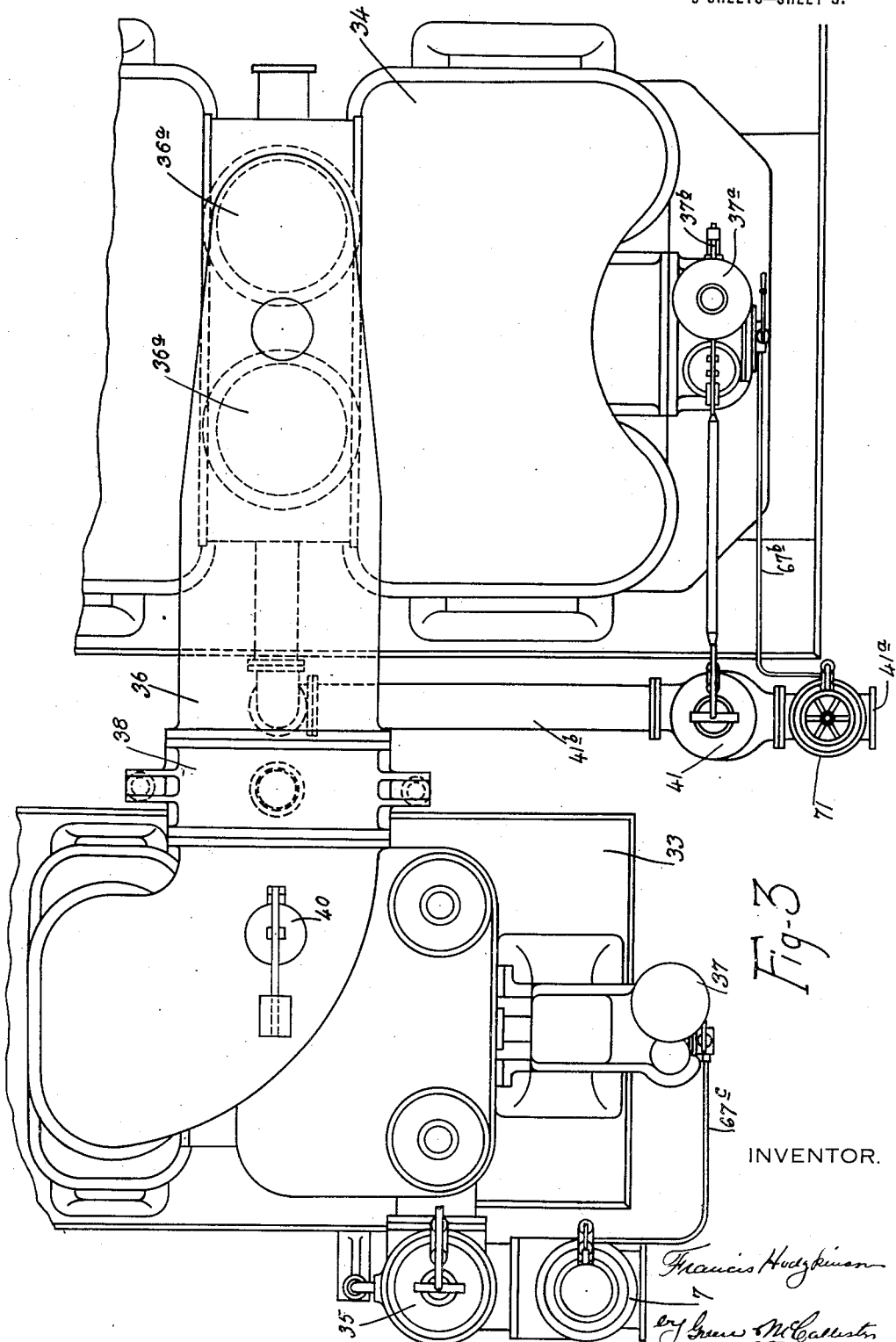

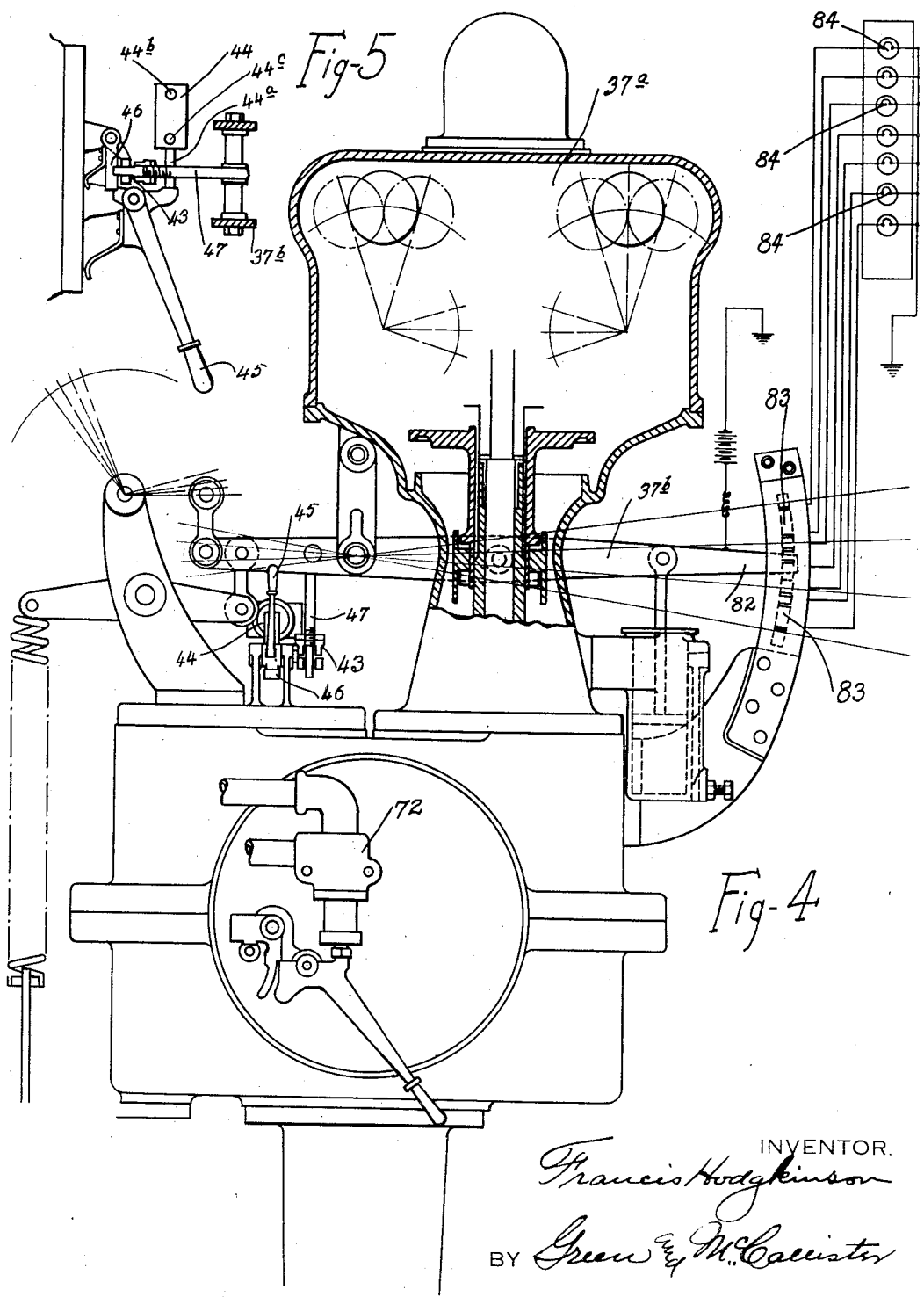

FRANCIS HODGKINSON, OF EDGEWOOD, PENNSYLVANIA, ASSIGNOR TO WESTINGHOUSE ELECTRIC & MANUFACTURING CO., A CORPORATION OF PENNSYLVANIA.

GOVERNING MECHANISM FOR COMPOUND ENGINES.

1,337,176.  Specification of Letters Patent.  Patented Apr. 13, 1920.

Application filed July 10, 1917. Serial No. 179,772.

*To all whom it may concern:*

Be it known that I, FRANCIS HODGKINSON, a subject of the King of Great Britain and Ireland, and a resident of Edgewood, in the county of Allegheny and State of Pennsylvania, have made a new and useful Invention in Governing Mechanism for Compound Engines, of which the following is a specification.

This invention relates to compound engines or turbines and particularly to governing means for such apparatus.

In compound turbine installations, it has proved to be good practice to operate each element or section of the turbine unit in connection with a separate load; for example, each section may drive a separate electric generator. The advantage gained by a power house equipped in this way is that it has the efficiency of a power house equipped with a large turbine and, in a measure, the flexibility of a power house equipped with a number of small turbines.

In such turbine installations means must be provided for isolating the turbine section directly affected by an accident from the other sections or the entire unit will have to be shut down in case of an accident to any one of the sections. In installations in which each section of the compound unit drives an electric generator and in which all of the generators are connected to the same electric distribution system, it may be desirable to have each generator connected to a separate section of the bus-bar and to connect feeders to each bus-bar section. With such an arrangement of electrical connections, the separate sections of the bus-bar will preferably be connected together through reactance, and each reactance element will preferably be by-passed by a circuit breaker, so that under normal conditions each of the generators connected to the sectional bus-bar will be capable of supplying current to the feeders of all of the bus-bar sections. A circuit breaker will also be employed between each generator and the section of the bus-bar to which it delivers current. In case of a short circuit on the feeders connected to any bus-bar sections, the bus-bar section thus affected will be immediately isolated except for the reactance by the throwing out of the circuit breakers and it will then become necessary to isolate the turbine section, which has been unloaded by the operation of the circuit breakers.

To accomplish this is an object of my present invention.

A further object is to produce a governing mechanism for a compound turbine, such as is above described, in which means are employed for automatically isolating one turbine section from the other section or sections and for permitting the other section or sections to continue in operation under load.

A further object is to produce a governing mechanism for compound engine or turbine units, in which means are employed for automatically cutting off communication between a low pressure section of the unit and the high pressure section, in response to an increase in speed of the low pressure section above a determined speed.

A further object is to produce a governor mechanism for a compound engine in which means are employed for automatically shutting off communication between a low pressure section of the engine and the high pressure section and then for delivering regulable amounts of motive fluid to the isolated section so that it will continue to operate at a determined speed.

A further object is to produce a new and improved governing mechanism, which operates at different speeds to control the operation of different fluid delivery devices.

These and other objects, which will be made apparent throughout the further description of the invention, are accomplished by means of apparatus herein described and illustrated in the drawings accompanying and forming a part hereof.

In the drawings: Figure 1 is a diagrammatic illustration of a turbine installation embodying my invention.

Fig. 2 is a more or less diagrammatic illustration of a somewhat modified form of turbine apparatus embodying my invention.

Fig. 3 is a fragmental plan view of apparatus shown in Fig. 2; a part of the apparatus is broken away for convenience of illustration.

Fig. 4 is a diagrammatic illustration of a governing mechanism which forms a detail of my invention.

Fig. 5 is a detailed view of a portion of the apparatus shown in Fig. 4.

Figure 6:
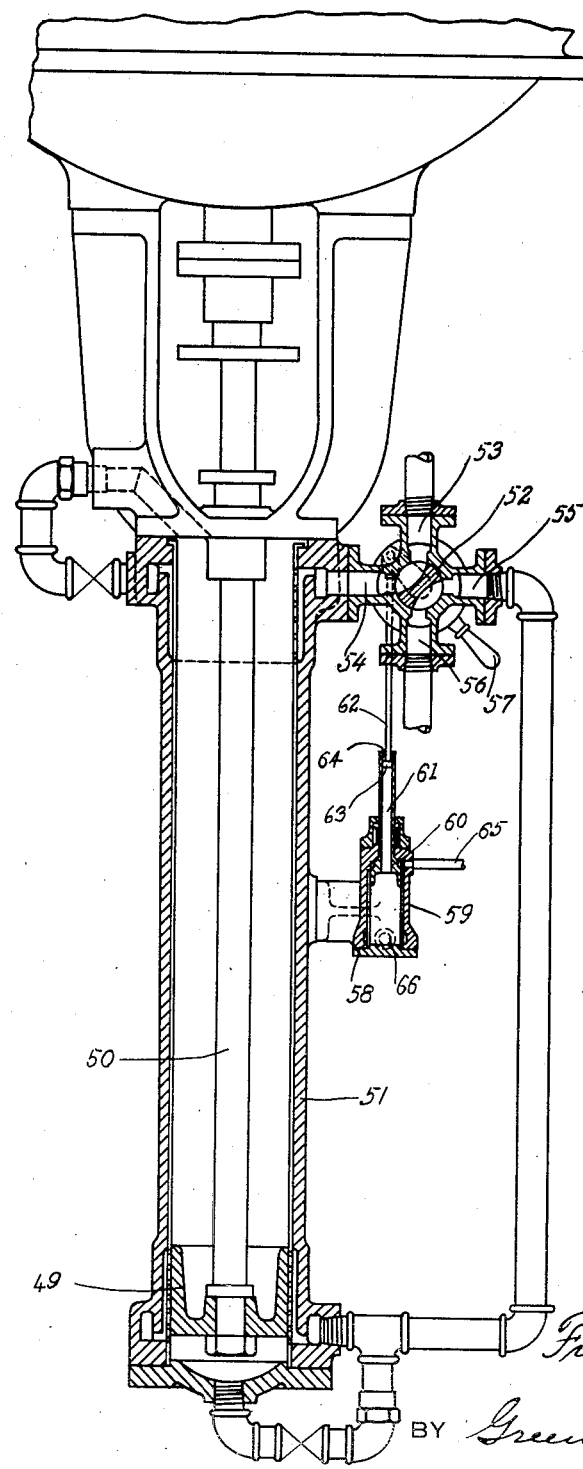
Fig. 6 is a partial sectional view of a valve controlling mechanism which forms a detail of the present invention and which is shown in connection with a fragmental elevation of the valve casing.

The apparatus illustrated in Fig. 1 includes a compound turbine unit consisting of a high pressure section 10 and two low pressure sections 11 and 11', which operate in parallel on fluid discharged from the high pressure section. It will be apparent to those skilled in the art that the present invention is not limited in its application to a turbine installation in which the low pressure sections operate in parallel, and that the invention is equally applicable to a compound unit in which the low pressure sections operate in series on motive fluid received from the high pressure section.

In the apparatus illustrated in Fig. 1, the turbine section 10 is essentially a high pressure section, since it is adapted to receive high pressure motive fluid, hereinafter termed steam, and to partially expand the same and deliver it to the low pressure sections. As illustrated, two low pressure sections 11 and 11' are employed and they operate in parallel on the steam delivered from the section 10. Each low pressure section is adapted to expand the steam delivered to it to exhaust or condenser pressure. An inlet valve 12 delivers steam to the section 10 in which it is partially expanded in doing work and from which it is delivered to the sections 11 and 11' through the exhaust port 13, and piping 14. The piping is so arranged that it normally divides the flow of steam issuing through the port 13 into two streams, one of which is delivered to the inlet port of low pressure section 11, whereas the other is delivered to the inlet port of the low pressure section 11'.

Under normal operating conditions the delivery of motive fluid to this compound unit is controlled by the operation of the inlet valve 12, which is controlled by a governor 15 driven by the turbine section 10. I have illustrated the valve 12 diagrammatically and have shown a diagrammatic arrangement of a governor controlled relay mechanism for controlling its operation. As illustrated, the governor lever 16 is fulcrumed intermediate its ends and is attached by means of a link 17, to a bell crank 18. One arm of the bell crank is connected to the floating lever 19 of the relay mechanism, which controls the operation of the valve 12. Inasmuch as this mechanism is well known in the art, I will not describe it in detail.

With the arrangement of apparatus shown, all of the turbine sections may operate in connection with the same load. In other words, Fig. 1 may be considered as illustrating a compound turbo generator set in which all the turbo generators feed into the same bus-bar. With such an arrangement, variations in the load will affect the speed of all of the turbine sections and consequently the governor 15 will be capable of proportioning the delivery of motive fluid in accordance with the load demand of the entire unit.

For the purpose of isolating any one of the sections in case of an accident, I have provided the piping 14 with two valves 20 and 21, the former being located in the piping 14 between the section 10 and the section 11', and the latter being located between the section 10 and the section 11. The function of the valve 20 is to shut off communication between the section 10 and the section 11', in case of an accident which will cause the section 11' to attain a speed in excess of a predetermined speed. This is accomplished by providing the valve 20, with an actuating mechanism, which is controlled by a speed responsive governor 22 which may be termed a three zone governor, driven by the section 11'. In the illustrated embodiment of my invention, the governor 22 is adapted to perform the double function of closing the valve 20 and also of proportioning the delivery of steam, from a separate source, to the section 11'. As illustrated in Fig. 4, and as will hereinafter be described in detail, the governor operates in response to variations in speed above the normal speed of the section 11' to control the operation of the valve 20, and it operates in response to variations in speed below the normal speed of the section 11', to control the operation of an inlet valve 23, which may receive steam from a separate source of supply through a pipe 24 and, as shown, is capable of delivering steam to the inlet port of the section 11' through a pipe 25, which communicates with the piping 14 on the delivery side of the valve 20. The valve 23 may be similar to the valve 12 of the high pressure section 10, and the governor actuated mechanism for controlling its operation may be similar to the mechanism described in connection with the governor 15. As shown, the section 11' is provided with a governor actuated mechanism similar to the section 10 and I have designated the corresponding parts by the same reference numerals.

I have illustrated the valve 20 as provided with a pressure actuated motor 20ᵇ, which is controlled by a governor 22 through the agency of a governor controlled trip mechanism. It will, however, be understood that any governor controlled mechanism may be employed.

As diagrammatically illustrated the trip mechanism includes a finger 26, mounted on the governor lever 16 and adapted to move into releasing engagement with a latch 27 when the governor responds to a speed in excess of the predetermined or safe speed. The latch 27 is so mounted that it is capable of being moved into latching engagement with one arm of a bell crank 28, which is pivotally mounted in such manner that it will swing away from the latch lever 27 when that lever disengages it. The bell crank 28 and the latch lever 27 are so arranged that the bell crank will engage the stem of a discharge valve 29 and hold the valve closed when the bell crank 28 is in latching engagement with the latch 27. The arrangement is also such that as soon as the bell crank is released from the latch 27, it will move away from the stem of the valve 29 and permit the valve to open, thereby causing the valve operating motor $20^b$ to close the valve 20. In Figs. 4, 5 and 6 I have illustrated in detail one form of a valve operating mechanism for the valve 20 and I will describe it more fully hereinafter.

The section 11 is provided with a governor 22, and a governor controlled mechanism similar to that just described and in which the corresponding parts are similarly numbered.

The operation of the apparatus, diagrammatically illustrated in Fig. 1, is as follows: A short circuit or other accident which will unload the turbine section 11′ or will cause that section to exceed the normal or a determined speed, will close the valve 20, through the operation of the governor 22 and the valve operating motor controlled by it. This will shut off the supply of steam delivered to the section 11′ through the pipe 14 and consequently the speed of that section will immediately decrease. The governor 22, responding to the decreasing speed, will first move through a neutral zone, in which it exerts no controlling action on the valve 23, and then it will start to open that valve and to deliver steam from the pipe 24 to the section 11′. The governor will, of course, be so adjusted that it will control the operation of the valve 23 in such a way, as to maintain the speed of the section 11′ as nearly normal speed as is practical, by proportioning the amount of delivery steam to the actual load or to the resistance to motion encountered by the turbine section.

The closing of the valve 20 affects the operation of the section 10 in that this section is arranged to deliver sufficient steam through the piping 14 to drive both of the sections 11 and 11′ and consequently a closing of the valve 20 causes the steam pressure to accumulate within the piping 14 and the working passages of the section 10, if means are not provided to take care of the excess fluid delivered to the piping 14, under such conditions. As illustrated diagrammatically in Fig. 1, I provide the piping 14 with a relief valve $28^a$ which is capable of discharging all of the fluid received from the section 10. This relief valve may communicate with the atmosphere through a stack, or if desired, it may communicate with a condenser, and is preferably so weighted that it will open in response to a determined pressure within the piping 14. As illustrated, the closing lever $29^a$ of the valve $28^a$ is provided with an adjustable weight $30^a$, for loading the valve to a pressure corresponding to the maximum load to which low pressure sections are capable of being subjected. If the low pressure sections drive electric generators, the loading of the relief valve will correspond to the maximum load that these generators are capable of sustaining for a predetermined brief period. With such an arrangement of apparatus, the closing of the valve 20 may cause the valve $28^a$ to open and discharge the excess steam from the piping 14.

It will be apparent that the operation of the section 11 is also controlled in the manner above described and that both the sections 11′ and 11 may be isolated from the section 10, by the closing of the valves 20 and 21 without materially affecting the operation of the section 10, since the relief valve 28 will open and discharge the excess steam, thereby preventing the pressure at the port 13 from rising materially above the pressure encountered during the normal operation of the low pressure sections. In addition to this, neither low pressure section will be shut down but, through the operation of its governor controlled high pressure valve, will receive sufficient steam, to cause it to keep turning over until it is again subjected to its normal load. This is advantageous since it prevents the low pressure sections from cooling down when they are temporarily deprived of their load and it also simplifies the operation of readjusting the load provided the three turbine sections drive electric generators which are operating in parallel on the same load.

An accident which will cause the high pressure section 10 to be unloaded or will cause its speed to increase above the normal speed will not materially affect the operation of the low pressure sections, since it will first cut off or decrease the supply of steam to the suction 10 and consequently to the sections 11 and 11′. This will cause the sections to decrease in speed and will finally cause the governors of the low pressure sections to operate to deliver high pressure steam to the low pressure sections. Any desired means may be employed for automatically shutting down the section 10 in case it is unloaded and in case its governor 15 does not respond quickly enough to prevent it from exceeding a safe or determined speed. For example, the section 10 may be provided with an automatic stop governor 31, such as is illustrated in my Patent No. 940,689 of November 23, 1909, which will positively shut off the supply of steam to the section 10, and consequently to the sections 11 and 11' in case the section 10 exceeds a determined or safe speed. Each low pressure section 11 and 11' is also illustrated as provided with an automatic stop valve 31 for the purpose of shutting off the supply of steam in case the section exceeds a determined or safe speed. The automatic stop governors of the low pressure sections are preferably so adjusted that they will only be called into operation in case of failure of the main governors 22, and each is adapted to cut off the supply of both high pressure and low pressure steam to its corresponding low pressure section. The high pressure steam supply to each low pressure section will preferably be controlled by the automatic stop governor through the agency of a separate valve 32, which is shown diagrammatically as a manually operated valve, but which may be provided with a pressure actuated valve disk capable of being controlled by a discharge valve such as the valve 29. The automatic stop governor 31 of each low pressure section may control the corresponding gate valve in the piping 14, in the manner described in connection with the valve 29, or in other words, each automatic stop governor may control the operation of a discharge valve, which is capable of exhausting fluid from a relay plunger, as will hereinafter be described, for the purpose of closing one of the gate valves, and also for the purpose of closing one of the valves 32. In this way both the high and low pressure steam supply will be shut off to one low pressure section or the other, in case its automatic stop governor operates.

The apparatus illustrated in Figs. 2 and 3 is a modification of the apparatus shown in Fig. 1 and includes a high pressure or main turbine section 33 and a low pressure turbine section 34. The high pressure section receives steam through an automatically controlled valve 35 and delivers partially expanded steam to the section 34 through a pipe or passage 36, which communicates with inlet ports $36^a$ of the section 34. The supply of high pressure steam to the section 33 is controlled by means of a governor 37, which may be of the ordinary type and consequently is not illustrated in detail. The governor controlled mechanism, actuated by the governor 37, and which controls the operation of the valve 35 may be of the usual type and is omitted from the drawings for the sake of simplicity. In order that the section 34 may be isolated from the section 33, I have provided the pipe 36 with a valve mechanism which, as illustrated, consists of a gate valve 38 and an operating mechanism 39. The piping is also provided with a relief valve 40, which corresponds in its operation to the relief valve $28^a$ of Fig. 1.

The section 34 is illustrated as a double flow section and the inlet ports $36^a$ are therefore located intermediate its ends. The section is provided with a valve 41, which corresponds to the valve 23 of the apparatus of Fig. 1, and is adapted to deliver high pressure steam to an inlet port of the section 34. This valve receives steam through a pipe $41^a$ and delivers it to the section 34 through the pipe $41^b$. The valve 41 is controlled by a governor $37^a$, which corresponds to the governor 22 of Fig. 1 and is illustrated more or less diagrammatically in Fig. 5. The usual form of relay mechanism 42 is employed for controlling the operation of the valve 41, and the governor lever $37^b$ is operatively connected to the relay in the usual manner. The governor $37^a$ has two functions, one to control the operation of the valve 41 and the other to close the valve 38 in the piping 36 when the section 34 exceeds a determined or a safe speed. For this reason the governor and its operating connections are so arranged that the governor may be termed a three zone governor, since during the normal operation of the low pressure section it exercises no direct controlling effect on either the valve 41 or the valve 38, whereas it operates to close the valve 38 when the section 34 exceeds a determined or safe speed, and it opens and controls the operation of the valve 41 after the speed of the section 34 has fallen below normal speed. It will be understood that while the governors 37 and $37^a$ may be mechanically similar, their regulating characteristics should differ, the adjustment of governor 37 to be as fine as required by the general requirements of the system in which the unit is employed. The governor $37^a$ must be adjusted to have a wide regulating characteristic so that the valve 38 will not be closed on the one hand or the valve 41 opened on the other, because of normal variations of load on the unit. The governor 37 should be able to travel its whole range with the incidental speed variations of the unit without the governor $37^a$ moving outside of its neutral zone. The governor control of the valve 38 is accomplished in the apparatus illustrated by means of a pressure actuated mechanism 39 and a controlling trip mechanism 43. (See Figs. 4 and 5.)

The trip mechanism illustrated includes a valve 44 and a trip lever 45 adapted to normally engage the valve stem 44ª and to hold the valve 44 closed. The lever 45 is operatively mounted on a suitable bracket or on a governor casing and is adapted to be latched into the valve closed position by means of a latch lever 46. The latch lever is adapted to be engaged by a finger 47 mounted on the governor lever 37ᵇ, and to be tripped out of latching engagement with the lever 45 when the section 34 exceeds a determined or safe speed. When the lever 45 is in latched engagement with the lever 46 communication is shut off between the ports 44ᵇ and 44ᶜ with which the valve 44 is provided and when the lever is tripped the valve disk forming a part of the valve 44 moves to establish communication between these ports. It will be apparent that the arrangement of the lever 45 is such that it must be manually readjusted after it has been tripped for the purpose of causing it to engage the valve stem 44ª and that it cannot move automatically into latching engagement with the lever 46.

The pressure actuated mechanism 39 for controlling the operation of the valve 38 includes a piston 49, which is mounted on the stem 50 of the valve 38 and is located within a cylinder 51. Fluid under pressure may be delivered to either end of the cylinder 51 by means of a three way valve 52. This valve is so arranged that it is not only capable of delivering actuating fluid to one end or the other of the cylinder 51, but it is also capable of placing one end or the other of the cylinder in communication with a discharge port. Fluid under pressure is delivered to the valve 52 through a port 53, and the valve is provided with a port 54 which communicates with the upper end of the cylinder, a port 55 which communicates with the lower end of the cylinder, and a port 56 which communicates with a discharge pipe. The valve is so arranged that when the fluid delivery port 53 is placed in communication with the port 54, the port 55 is then in communication with the port 56 and when the ports 53 and 55 are in communication the ports 54 and 56 communicate with each other. While the valve 52 is capable of being manually controlled by means of a lever 57, it is also capable of being automatically controlled by the operation of the valve 44 (see Fig. 5) through the agency of a relay 58.

The relay 58 illustrated, includes a cylinder 59, which incloses a differential piston 60. The piston is provided with a hollow piston rod 61 into which a link 62 projects. One end of the link 62 is operatively connected to an operating arm of the valve 52, whereas the other end is provided with an enlarged head 63, which fits the bore of the hollow rod 61 and is adapted to be operatively connected to the rod by means of a reentrant flange 64 formed on the upper end of the rod and adapted to engage the head 63 of the link. With this arrangement, the valve 52 may be manually operated for the purpose of moving it from the position indicated to a position in which the ports 53 and 55 are placed in communication with each other and the piston 49 is caused to move in response to fluid pressure to close the valve 38.

Fluid under pressure is delivered to the cylinder 59 of the relay mechanism through a pipe or passage 65 and is so arranged that the fluid delivered by it is admitted to an annular chamber located above the differential piston 60. This chamber communicates with the space below the piston by means of a leakage or restricted passage and the space below the piston is provided with a discharge port 66 which communicates by means of piping 67 (Fig. 2) with the port 44ᵇ of the valve 44 (Fig. 5). With this arrangement the pressure below the piston 60 will equal that in the differential pressure chamber when the valve 44 is closed and consequently the piston 60 will be forced to the upper end of its stroke by the differential pressure to which it is subjected. The port 66, the piping 67 and the ports 44ᵇ and 44ᶜ are of such area that they will deliver fluid more rapidly from the cylinder 59 than the leakage or restricted passage is capable of supplying fluid to the space below the piston 60. Consequently when the valve 44 opens, in response to the tripping of the lever 45, the space below the piston 60 will be exhausted and the fluid pressure within the differential chamber above the piston will cause the piston to move downwardly. This movement of the piston will shift the position of the valve 52 so as to place the lower end of the cylinder 51 in communication with the fluid inlet port 53 and the upper end in communication with the fluid passage port 56. The piston 49 will therefore move to close the valve 38, and the valve will shut off communication between the sections 33 and 34.

The operation of the valve 38, above described, will occur in response to an increase in speed of the section 34 above the normal or predetermined speed. The closing of the valve 38 will cut off the supply of fluid to the section 34 and the section will consequently slow down. As it slows down the governor 37ª will move back through the neutral zone and, after the speed of the section 34 has decreased a predetermined amount, will start to open the valve 41 and to supply high pressure steam to the section 34. Under ordinary conditions the governor 37ª will so proportion the supply of high pressure steam to the low pressure section that the section will continue to operate at a materially reduced speed. The governing mechanism may, however, be provided with a switchboard control 70 of a usual and well known form, which may be employed for varying the adjustment of the governor so that it will actuate the valve 41 to deliver sufficient high pressure steam to continue the section 34 in operation under load and at substantially normal speed. Such an arrangement of apparatus is desirable, since the low pressure steam supply to the low pressure section may be cut off or materially reduced by an accident to the high pressure section or to the apparatus driven by it, and under such conditions it will be necessary to continue the operation of the low pressure section so that it can carry full load. Where a switch board control is employed the arm $37^b$ may be provided with an electric contact such as extension 82, which coöperates with electric contacts 83, for the purpose of indicating by means of lamps 84 on the switch board the position of the governor arm. In this way the attendant may control the turbine from the switch board. Both the high and low pressure sections are provided with automatic stop valves 71, each of which is located in the high pressure steam line supplying steam to its respective section. The automatic stop valve may be of any type, such for example, as the valve illustrated in my Patent No. 978,294 of December 13, 1910.

As illustrated, each automatic stop valve is controlled by an automatic stop governor 72, through the agency of a relay 73. The automatic stop governor of the control mechanism is of the usual form and need not be specifically described, except to say that each governor is similar in some respects to the trip mechanism illustrated in Fig. 5 and is adapted to control the operation of a discharge valve similar to the valve 44. This discharge valve in turn controls the operation of the relay which actuates the automatic cut off valve. In addition to this, each relay 73 is adapted to control the operation of an electric relay 74, which in turn, is adapted to control the operation of the circuit breaker located between the generator and the bus-bar to which it supplies current. With this arrangement the circuit breaker may be thrown out by the automatic operation of the automatic stop governor or it may be instantaneously thrown out by manually tripping the automatic stop governor in case the section or the generator driven by it is not operating properly. In Fig. 2, I have shown a branch pipe $67^a$ for placing the piping 67 in communication with the discharge piping $67^b$ controlled by the operation of the automatic stop governor 72 of the section 34. With such an arrangement, the stop governor of the section 34 will not only close the automatic stop valve 71 in the high pressure supply line, but will also close the valve 38 in case it is called into operation by the section 34 exceeding the speed at which it is set to operate. By reason of the check valve $67^E$ the operation of the relay, Fig. 5, will only bring about the closing of the valve 38.

With the arrangement illustrated in Figs. 2 and 3, either the initial or the low pressure section will continue in operation after the other section is shut down or is unloaded due to an accident to it or to the apparatus driven by it.

It will be apparent that in installations in which the low pressure section drives an independent load some means, other than the governor of the high pressure section, must be employed in proportioning the delivery of steam to the low pressure sections. This may be accomplished by employing a valve operating mechanism between the high and the low pressure sections which will open and close communication between those sections in response to variations in the load on the low pressure section, but which will close and remain closed in case the low pressure section exceeds a safe or determined speed.

While I have described and illustrated several embodiments of my invention, it will be apparent to those skilled in the art that various changes, modifications, additions and omissions may be made in the apparatus described and illustrated without departing from the spirit and scope of the invention, as set forth by the appended claims.

What I claim is:

1. In combination with the independently moving high and low pressure sections of a compound fluid pressure engine, means responsive to variations in speed of the high pressure section for controlling the delivery of fluid to the low pressure section, and means for controlling the delivery of fluid to the low pressure section responsive to variations in speed of the low pressure section for shifting the governing function of the low pressure section from said first mentioned to said last mentioned means.

2. A governing mechanism for compound engines having independently moving high and low pressure sections responsive to the same load fluctuations, comprising a valve between the high and a low pressure section of the engine, means for delivering high pressure motive fluid to the low pressure section, and means responsive to variations in the speed of the low pressure section for controlling the operation of said valve and said fluid delivery means.

3. In combination with a compound engine having independently moving high and low pressure sections responsive to the same load fluctuations, a valve for closing communication between the high pressure and a low pressure section of the engine, means for delivering high pressure motive fluid to the low pressure section, and a governing mechanism responsive to variations in speed of the low pressure section for closing said valve and for controlling said means to proportion the delivery of high pressure motive fluid to the low pressure section.

4. In combination with a compound engine having independently moving high and low pressure sections responsive to the same load fluctuations, comprising a high pressure section and at least one low pressure section, a governing mechanism therefor comprising means for proportioning the delivery of high pressure motive fluid to the low pressure section, a valve for closing communication between the high pressure and the low pressure section and a governing mechanism responsive to the speed of the low pressure section for closing said valve when the low pressure section exceeds a determined speed, and for controlling the operation of said fluid delivery means when said low pressure section falls to a determined speed.

5. A compound engine, comprising a high pressure section, and at least one low pressure section moving independently of the high pressure section, in combination with a governing mechanism for proportioning the delivery of high pressure motive fluid to the high pressure section, a valve for controlling communication between said sections, means for delivering high pressure motive fluid to said low pressure section, a trip mechanism for closing said valve and a governing mechanism for the low pressure section for actuating said trip mechanism to close the valve when the low pressure section exceeds a determined speed, and means for controlling the operation of said fluid delivery means to proportion the delivery of fluid to the low pressure section when the speed of the low pressure section falls below a determined speed.

6. In combination with the independently moving high and low pressure sections of an engine, means for closing off communication between said sections, means for delivering high pressure motive fluid to the low pressure section, and governing means responsive to the speed of the low pressure section, which normally exerts no controlling action on said previously mentioned means, but which operates to close the first mentioned means when the low pressure section exceeds a determined speed and to control the operation of the second mentioned means when the speed of the low pressure sections falls below a determined speed.

7. In combination with the independently moving high and low pressure sections of an engine, a normally open passage between the high and low pressure sections, a valve for closing said passage, means for delivering high pressure motive fluid to the low pressure section, a governing mechanism responsive to variations in speed of the low pressure section and normally having no controlling effect on said valve and said means, closing means for said valve actuated by said governing mechanism when the low pressure section exceeds a determined speed, and operating means for said fluid delivery means controlled by said governor to deliver high pressure motive fluid to the low pressure section when the speed of the section falls below a determined speed.

8. In combination with an engine, means for delivering actuating fluid thereto from two sources, a valve for controlling the delivery of fluid from one of said sources to said engine, a second valve for controlling the delivery of motive fluid to the engine from the other source, and a governor driven by the engine and having no controlling effect on either valve throughout a determined range of speed variations of the engine, mechanism controlled by said governor for controlling the operation of one valve when the engine attains a determined speed, and for controlling the operation of the other valve when the engine speed is decreased to a determined speed.

9. In combination with an engine, receiving motive fluid from different sources, a separate valve mechanism for controlling the delivery to the engines from each source, a governor driven by the engine for controlling the operation of the different valves at different speeds of the engine, said governor having no active controlling effect on any of the valve mechanisms throughout a determined range of speeds of the engine.

10. In combination with an engine receiving motive fluid from two different sources, separate valve mechanism for controlling the delivery of fluid from each source to said engine, a governor driven by the engine and having no controlling effect on either valve throughout a determined range of speeds of the engine, means actuated by the governor to close one valve mechanism when the engine exceeds a determined speed, and means controlled by the governor to open and to actively control the operation of the other valve mechanism after the engine speed has decreased to a determined speed.

11. In combination with an engine receiving motive fluid from two different sources, separate valve mechanisms for controlling the delivery of fluid from each source to said engine, a governor driven by the engine and having no active controlling effect on either valve throughout a determined range of speeds of the engines, a trip mechanism for controlling the operation of one valve mechanism to close off communication between the engine and one source of supply when the engine exceeds a determined speed, and means actuated by the governor for controlling the operation of the other valve mechanism to proportion the delivery of fluid to the engine in accordance with the speed of the engine, after the speed of the engine has decreased to a determined speed.

12. In combination with an engine receiving motive fluid from two different sources, separate valve mechanism for controlling the delivery of fluid from each source to said engine, a governor driven by the engine and having no active controlling effect on either valve throughout a determined range of speeds of the engine, a trip mechanism for controlling the operation of one valve mechanism to close off communication between the engine and one source of supply and to maintain said mechanism in a closed position independently of the speed of the engine, when the engine speed has increased to a determined speed and means for actively controlling the other valve mechanism in response to the operation of the governor when the engine has decreased in speed to a determined speed.

13. In combination with an engine, two valves, each adapted to control the delivery of motive fluid from different sources of supply, one of said valves being normally open and the other normally closed, a governor mechanism responsive to variations in speed of the engine, and adapted to close the normally open valve when the engine exceeds a determined speed and to control the operation of the normally closed valve to proportion the delivery of motive fluid to the engine after the engine falls below a determined speed.

14. In combination with an engine, two valves each adapted to control the delivery of motive fluid from a different source of supply, a governing mechanism responsive to variations in speed of the engine, a trip mechanism controlled by the governor to positively close the normally open valve when the engine exceeds a determined speed and an actuating mechanism for controlling the normally closed valve to proportion the delivery of motive fluid to the engine in response to variations in speed when the engine has decreased in speed.

15. In combination in a compound engine having independently moving high and low pressure sections responsive to the same load fluctuations, a high pressure section adapted to deliver partially expanded motive fluid to a low pressure section of the engine, a valve for controlling the delivery of motive fluid to the high pressure section responsive to speed variations of one of the sections, a normally open valve between the high and low pressure sections, and a governing mechanism driven by the engine for closing said valve.

16. In combination in a compound engine having independently moving high and low pressure sections responsive to the same load fluctuations, a high pressure section adapted to deliver partially expanded motive fluid to a low pressure section of the engine, a valve for controlling the delivery of motive fluid to the high pressure section responsive to speed variations of one of the sections, a normally open valve between the high and low pressure sections, a valve for controlling the delivery of motive fluid to the low pressure section, and a governor mechanism driven by the engine for closing the normally open valve when the speed of the low pressure section exceeds a determined degree.

17. In a compound engine, a high pressure section, a low pressure section moving independently of the high pressure section, a normally open valve between said sections, a valve for controlling the delivery of high pressure steam to the high pressure section, a valve for controlling the delivery of high pressure steam to the low pressure section, a governor responsive to the speed of the low pressure section for controlling the operation of the high pressure steam delivery valve to that section when the low pressure section falls below a determined speed, and for positively closing the normally open valve when the low pressure section exceeds a determined speed.

18. In a compound engine, a high pressure section, a low pressure section moving independently of the high pressure section, a normally open valve between said sections, a valve for controlling the delivery of high pressure steam to the high pressure section, a valve for controlling the delivery of high pressure steam to the low pressure section, a governor responsive to variations in the speed of the low pressure section but having no active controlling effect on the valves of the engine throughout a determined range of its operation, means controlled by the governor for closing the normally open valve when the speed of the low pressure section exceeds a determined speed and means actuated by said governor for opening the high pressure steam valve of the low pressure section when the speed of the section falls to a determined speed.

19. In a compound engine, a high pressure section, a low pressure section moving independently of the high pressure section, a normally open valve between said sections, a valve for controlling the delivery of high pressure steam to the high pressure section, a valve for controlling the delivery of the low pressure steam to the low pressure section, a governor responsive to variations in the speed of the low pressure section but having no active controlling effect on the valves of the engine throughout a determined range of its operation, means controlled by the last mentioned governor for closing the normally open valve when the speed of the low pressure section exceeds a determined speed, means actuated by said governor for opening the high pressure steam valve of the low pressure section when the speed of the section falls to a determined speed, and an automatic stop governor responsive to the speed of the low pressure section for closing the normally open valve and for shutting off the supply of high pressure fluid to the low pressure section.

20. A turbine comprising a high pressure section and a low pressure section moving independently of the high pressure section, said high pressure section delivering partially expanded steam to the low pressure section, a normally open valve between said sections, an inlet valve for delivering high pressure steam to the high pressure section, a high pressure steam delivery valve for the low pressure section, a governor for the high pressure section for controlling the operation of the inlet valve, an automatic stop governor for the high pressure section for closing the supply of high pressure fluid to the high pressure section, a governor for the low pressure section for controlling the delivery valve and for closing the normally open valve, and an automatic stop governor for the low pressure section for closing the normally open valve and for shutting off the supply of high pressure fluid to the low pressure section.

21. A turbine installation comprising a high pressure section adapted to partially expand motive fluid delivered to it, a low pressure section normally receiving fluid discharged from the high pressure section and moving independently of the high pressure section, the said sections being responsive to the same load fluctuations, a normally open valve between said sections, means for delivering high pressure fluid to the low pressure section, and a governor responsive to the speed of the low pressure section for controlling the operation of said valve and said means.

In testimony whereof I have hereunto subscribed my name this 9th day of July, 1917.

FRANCIS HODGKINSON.

Witness:
C. W. McGhee.